United States Patent
Kromrey et al.

(10) Patent No.: US 10,183,672 B2
(45) Date of Patent: Jan. 22, 2019

(54) METHOD TO OPTIMIZE ENGINE OPERATION USING ACTIVE FUEL MANAGEMENT

(71) Applicant: GM Global Technology Operations LLC, Detroit, MI (US)

(72) Inventors: Chad D. Kromrey, Perry, MI (US); Zhong Li, Novi, MI (US); Nigel K. Hyatt, West Bloomfield, MI (US); Andrew J. Harkenrider, Oakland Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 193 days.

(21) Appl. No.: 15/251,645

(22) Filed: Aug. 30, 2016

(65) Prior Publication Data
US 2018/0057007 A1    Mar. 1, 2018

(51) Int. Cl.
| | | |
|---|---|---|
| *B60W 10/06* | (2006.01) | |
| *B60W 30/188* | (2012.01) | |
| *B60W 10/10* | (2012.01) | |
| *F02D 17/02* | (2006.01) | |
| *F02D 41/00* | (2006.01) | |

(Continued)

(52) U.S. Cl.
CPC ........ *B60W 30/1882* (2013.01); *B60W 10/06* (2013.01); *B60W 10/10* (2013.01); *F02D 17/02* (2013.01); *F02D 41/0002* (2013.01); *F02D 41/0087* (2013.01); *F02D 41/10* (2013.01); *F02D 41/3005* (2013.01); *B60W 2510/0604* (2013.01); *B60W 2510/0609* (2013.01); *B60W 2510/0657* (2013.01); *B60W 2540/10* (2013.01); *B60W 2540/106* (2013.01); *B60W 2710/0622* (2013.01); *B60W 2710/0644* (2013.01); *B60W 2710/0666* (2013.01); *B60W 2710/0672* (2013.01); *F02D 2250/18* (2013.01); *F02D 2250/21* (2013.01)

(58) Field of Classification Search
CPC ............ B60W 30/1882; B60W 10/06; B60W 2510/0657; B60W 2710/0622; B60W 2510/0604; B60W 2510/0609; B60W 2540/10; B60W 2540/106; B60W 2710/066; B60W 2710/0672; B60W 2710/0666; F02D 17/02; F02D 41/10
USPC ....................................... 701/101
See application file for complete search history.

(56) References Cited

U.S. PATENT DOCUMENTS

| | | | | |
|---|---|---|---|---|
| 5,408,974 A | * | 4/1995 | Lipinski | F02D 17/02 123/198 F |
| 6,886,524 B2 | * | 5/2005 | Hanada | B60K 6/485 123/198 F |

(Continued)

*Primary Examiner* — Roger L Pang

(57) ABSTRACT

A method for operating an internal combustion engine comprises providing a vehicle having an internal combustion gasoline engine including multiple cylinders and wherein the engine is operating in a deactivated cylinder mode, receiving a torque request if a cylinder reactivation torque smoothing mode is active, setting a variable torque ratio to 1.0 if the torque request is greater than a fast exit threshold torque, setting the variable torque ratio to 0.0 if the torque request is less than a slow exit threshold torque, setting the variable torque ratio to a value between 0.0 and 1.0 if the torque request is between the fast exit threshold torque and slow exit threshold torque, and calculating a component of final engine output torque.

20 Claims, 4 Drawing Sheets

(51) Int. Cl.
*F02D 41/10* (2006.01)
*F02D 41/30* (2006.01)

(56) References Cited

U.S. PATENT DOCUMENTS

| | | | |
|---|---|---|---|
| 9,739,213 B2* | 8/2017 | Kemmerling | F02B 25/145 |
| 9,835,096 B2* | 12/2017 | Vosz | F02D 17/02 |
| 2017/0167461 A1* | 6/2017 | Kanno | F02N 11/0814 |
| 2017/0218866 A1* | 8/2017 | Shost | F02D 41/0087 |

* cited by examiner

METHOD TO OPTIMIZE ENGINE OPERATION USING ACTIVE FUEL MANAGEMENT

FIELD

The invention relates generally to automobile engine control and more particularly to operation of an internal combustion engine while the engine is being run in an active fuel management mode for optimization of fuel efficiency.

BACKGROUND

The statements in this section merely provide background information related to the present disclosure and may or may not constitute prior art.

A typical internal combustion engine is a combination of systems that individually serve a specific function. The air intake system provides throttled air to the engine. The fuels system stores, transports, and regulates fuel flow into the combustion chambers of the engine. The ignition system provides spark for igniting the air/fuel mixture. The power conversion system converts the chemical energy of combustion into work that is transferred to the tires of the vehicle. Other systems perform functions that improve fuel economy and emissions, cool the engine and provide heat to the vehicle cabin, or run other accessories such as power steering or air conditioning.

The size of the engine is typically tailored to the size and purpose of the vehicle. For example, a small light car built for fuel efficiency may include a small three cylinder or four cylinder engine with 1.5 to 2.0 Liters of displacement. Alternatively, a full-size pick-up truck or van that is purposely built for carrying tools and pulling machinery will require an engine having a larger displacement and more cylinders. A displacement of 4.5 L and above in a V8 or V10 configuration provides the torque and power required to carry and pull heavy loads. However, there are occasions of use when such a vehicle will not require all of the torque available in the V8 or V10 engine. It is during such occasions that it becomes desirable from a fuel efficiency standpoint to simply not use all of the cylinders that are available. Thus, a method of operating the engine has been developed to improve fuel economy while maintaining the overall capacity of torque available to the vehicle operator.

Active fuel management methods have been developed which include shutting off fuel delivery to a cylinder when the torque demand on the engine is low. However, there are many issues with controlling an engine and powertrain when using active fuel management. Drivability, torque demand, Noise and Vibration must all be maintained or improved while at the same time improving fuel economy. Thus, while current active fuel management controls achieve their intended purpose, the need for new and improved active fuel management controls which ensure the vehicle operators expectations are achieved is essentially constant. Accordingly, there is a need for an improved and reliable active fuel management controls system and method.

SUMMARY

An internal combustion engine control method is provided, the method includes providing a vehicle having an internal combustion gasoline engine including multiple cylinders and wherein the engine is operating in a deactivated cylinder mode, receiving a torque request if a cylinder reactivation torque smoothing mode is active, setting a variable torque ratio to $r_{max}$ if the torque request is greater than a fast exit threshold torque $t_{fast}$, setting the variable torque ratio to $r_{min}$ if the torque request is less than a slow exit threshold torque $t_{slow}$, setting the variable torque ratio to a value between $r_{max}$ and $r_{min}$ if the torque request is between the fast exit threshold torque and slow exit threshold torque, and calculating a final engine output torque.

In one aspect of the present invention, calculating a final engine output torque further comprises calculating a final engine output torque according to the formula:

$$t_f = t_{slow} + r(t_{fast} - t_{slow}), \text{ and}$$

wherein $t_{fast}$ is the fast exit threshold torque, $t_{slow}$ is the slow exit threshold torque, and r is the variable torque ratio.

In another aspect of the present invention, setting the variable torque ratio to a value between $r_{min}$ and $r_{max}$ if the torque request is between the fast exit threshold torque $t_{fast}$ and slow exit threshold torque $t_{slow}$ further comprises setting the variable torque ratio to a value proportional to the torque request if the torque request is between the fast exit threshold torque $t_{fast}$ and slow exit threshold torque $t_{slow}$.

In yet another aspect of the present invention, setting a variable torque ratio to $r_{max}$ if the torque request is greater than a fast exit threshold torque $t_{fast}$ further comprises setting a variable torque ratio to 1.0 if the torque request is greater than a fast exit threshold torque.

In yet another aspect of the present invention, setting the variable torque ratio to $r_{min}$ if the torque request is less than a slow exit threshold torque $t_{slow}$ further comprises setting the variable torque ratio to 0.0 if the torque request is less than a slow exit threshold torque.

In yet another aspect of the present invention, setting a variable torque ratio to $r_{max}$ if the torque request is greater than a fast exit threshold torque $t_{fast}$ further comprises setting the variable torque ratio to $r_{max}$ if the torque request is greater than the fast exit threshold torque $t_{fast}$ wherein the fast exit threshold torque $t_{fast}$ is derived from calibration tables having a fast exit threshold torque $t_{fast}$ value for a plurality of operational parameters.

In yet another aspect of the present invention, setting a variable torque ratio to $r_{min}$ if the torque request is less than a slow exit threshold torque $t_{slow}$ further comprises setting the variable torque ratio to $r_{min}$ if the torque request is less than the slow exit threshold torque $t_{slow}$ wherein the slow exit threshold torque $t_{slow}$ is derived from calibration tables having a slow exit threshold torque $t_{slow}$ value for a plurality of operational parameters.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
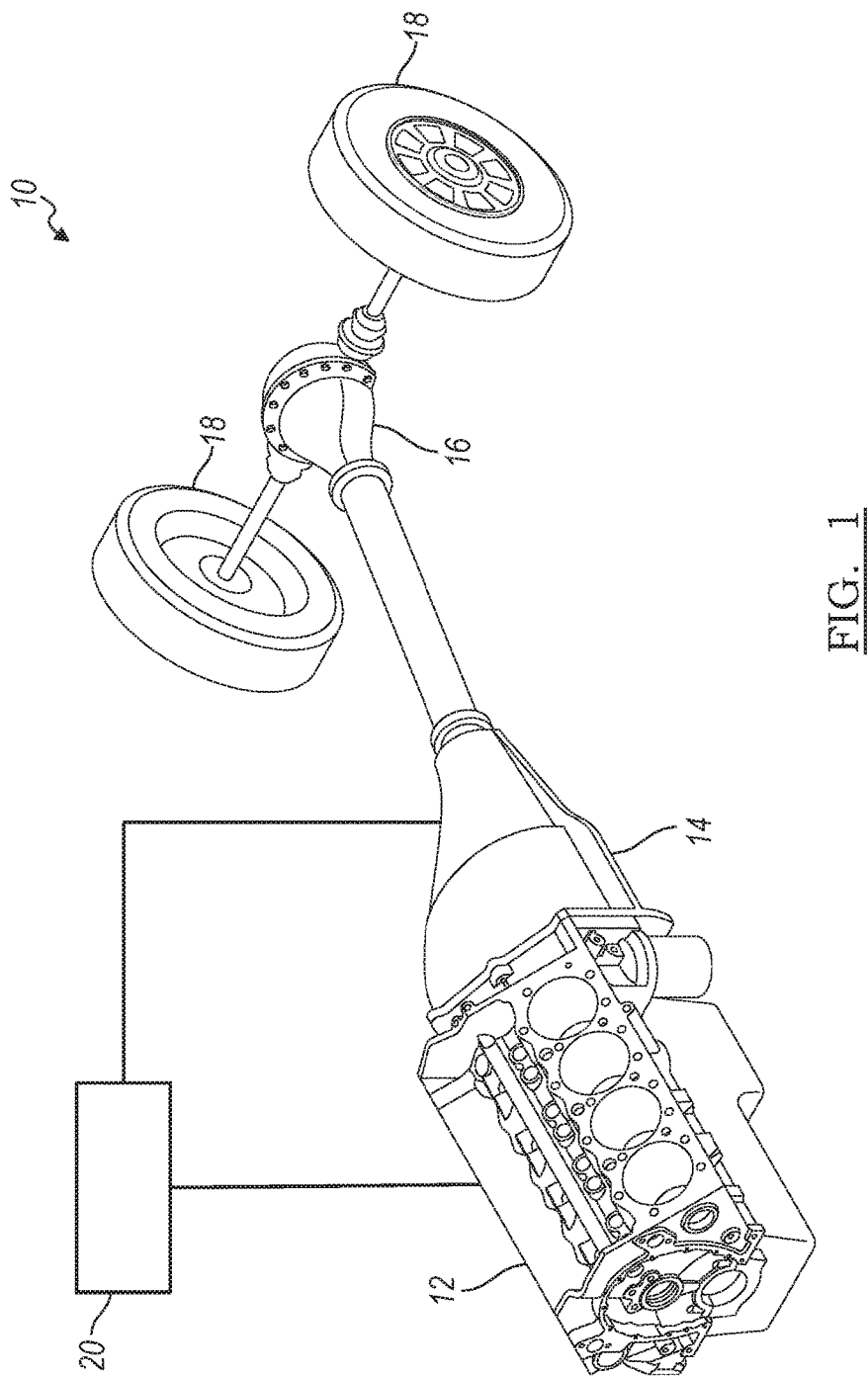
FIG. 1 is a depiction of a powertrain of a vehicle in accordance with an aspect of the present invention.

With reference to FIG. 1, an exemplary powertrain is generally indicated by reference number 10. The powertrain 10 includes an engine 12, a transmission 14, a driveshaft and rear differential 16, drive wheels 18, and a powertrain control module 20. The engine 12 is an internal combustion engine that supplies a driving torque to the transmission 14. Traditionally, an internal combustion engine is identified by the number of cylinders it includes and in what configuration the cylinders are arranged. The engine 12 shown is a V8 configured engine 12 as the engine 12 includes eight cylinders arranged in a "V" configuration. The transmission 14, capable of several forward gear ratios, in turn delivers torque to the driveshaft and rear differential 16 and drive wheels 18.

Figure 2:
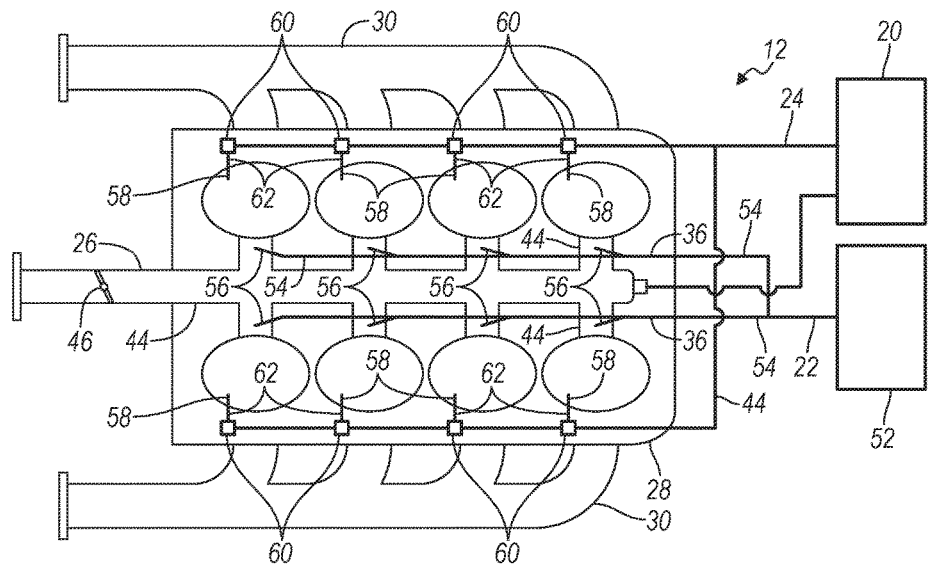
FIG. 2 is a top view schematic of an internal combustion engine, in accordance with an aspect of the present invention.
Figure 3:
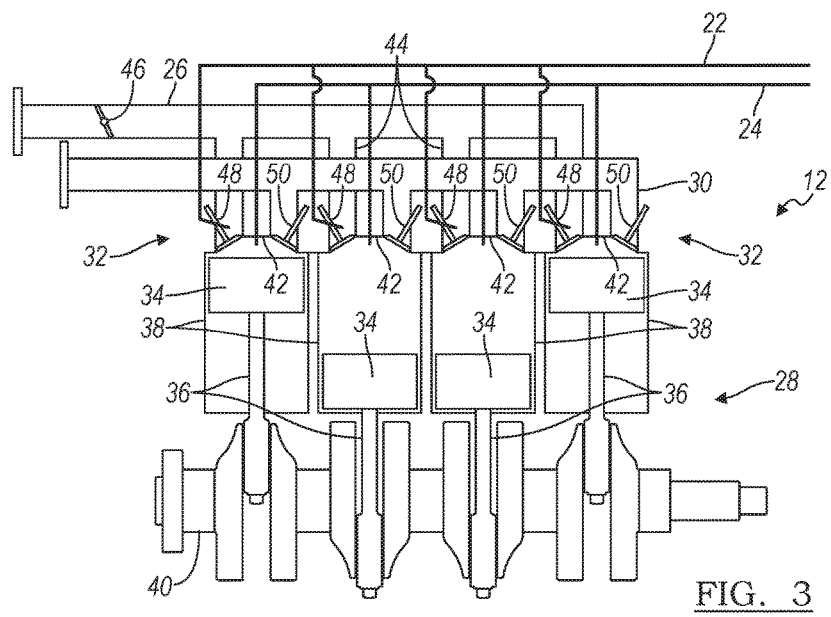
FIG. 3 is a side view schematic of an internal combustion engine, in accordance with an aspect of the present invention.

Turning now to FIGS. 2 and 3, the engine 12 is illustrated and described in greater detail. The engine 12 as a system is a combination of multiple sub-systems operating in a coordinated manner managed by the powertrain control module 20 to convert combustion into mechanical work. For example, the engine 12 may include a fuel delivery system 22, an ignition system 24, an air intake system 26, a power conversion system 28, an exhaust system 30, and a valve-train system 32, among other subsystems. More particularly, the power conversion system 28 includes a plurality of pistons 34, connecting rods 36, cylinders 38, and a crankshaft 40. Each piston 34 is disposed in one of the cylinders 38 with the piston 34 pinned to an end of a connecting rod 36 with the other end of the connecting rod 36 pinned to an offset journal of the crankshaft 40. The top side of the piston 34 and the cylinder 38 form a combustion chamber 42. The crankshaft 40 is connected on one end to an output member (not shown) for transferring torque to the transmission 14.

The air intake system 26 includes a plurality of air ducts 44 and a throttle valve 46. The throttle valve 46 controls the amount of airflow passing into the air intake system 26 while the air ducts 44 direct incoming air to be used in the combustion process into the combustion chamber 42.

The valvetrain system 32 includes an intake valve 48 and an exhaust valve 50 in each cylinder 38 and a mechanism (not shown) for actuating the intake valve 48 and exhaust valve 50. The intake valve 48 opens to allow communication between the air ducts 44 of the air intake system 26 and the combustion chamber 42. In the present example, there is only one intake valve 48 and one exhaust valve 50 in each combustion chamber 42. However, a valvetrain system 32 having more than one intake valve 48 or exhaust valve 50 in each cylinder 38 may be considered without departing from the scope of the present invention.

The fuel delivery system 22 includes a pressurized fuel source or fuel pump 52, fuel lines 54, and fuel injectors 56. The fuel pump 52 is disposed in the fuel tank (not shown) located elsewhere in the vehicle. The fuel pump 52 pressurizes the fuel lines 54 which deliver pressurized fuel to the fuel injectors 56. The fuel injectors 56 are disposed in the air ducts 44 of the air intake system 26 proximate the intake valve 48. The fuel injectors 56 may also be located in the combustion chamber 42 wherein the fuel is injected directly into the combustion chamber 42.

The ignition system 24 includes spark plugs 58, ignition coils 60, and ignition wires 62. A single spark plug 58 is disposed in each of the combustion chambers 42. An ignition coil 60 is disposed electrically between the powertrain control module 20 and each of the spark plugs 58. The powertrain control module 20 sends a low voltage electric signal to the ignition coils 60 where the signal is stepped to a high-voltage signal required to create a spark and then sent to the spark plugs 58 through the ignition wires 62.

The exhaust system 30 collects exhaust gases from the combustion process in the combustion chamber 42 and directs the gases through a series of aftertreatment mechanisms such as catalytic converters and mufflers (not shown). Some of the exhaust gases can be diverted back to the intake system for improved combustion and fuel economy.

The powertrain control module 20 is electronically connected to at least the engine 12 and transmission 14 and is preferably an electronic control device having a preprogrammed digital computer or processor, control logic, memory used to store data, and at least one I/O peripheral. The control logic includes a plurality of logic routines or sequence for monitoring, manipulating, and generating data. The powertrain control module 20 controls the operation of each of the engine 12 and transmission 14. The control logic may be implemented in hardware, software, or a combination of hardware and software. For example, control logic may be in the form of program code that is stored on the electronic memory storage and executable by the processor. The powertrain control module 20 receives the output signals of several sensors throughout the transmission 14 and engine 12, performs the control logic and sends command signals to the engine 12 and transmission 14. The engine 12 and transmission 14 receive command signals from the powertrain control module 20 and converts the command signals to control actions operable in the engine 12 and transmission 14. Some of the control actions include but are not limited to increasing engine 12 speed, changing air/fuel ratio, changing transmission 14 gear ratios, etc, among many other control actions.

For example, a control logic implemented in software program code that is executable by the processor of the powertrain control module 20 includes control logic for implementing a method of operating the engine 12 in an active fuel management or cylinder deactivation mode or method. The cylinder deactivation mode is initiated to improve fuel consumption by cutting off fuel delivery to or deactivating selected cylinders while torque demand on the engine is less than the maximum torque available from the engine. A portion of the cylinder deactivation mode is controlling the operation of the engine as the engine is operating under cylinder deactivation mode and the vehicle operator is requesting additional torque. Such a portion of engine control is a cylinder reactivation torque smoothing control method 100. An important goal of the cylinder reactivation torque smoothing control method 100 is to provide a smooth, measured increase in torque from the engine 12 as the operator is requesting an increase in torque delivery to the wheels 18.

Figure 4:
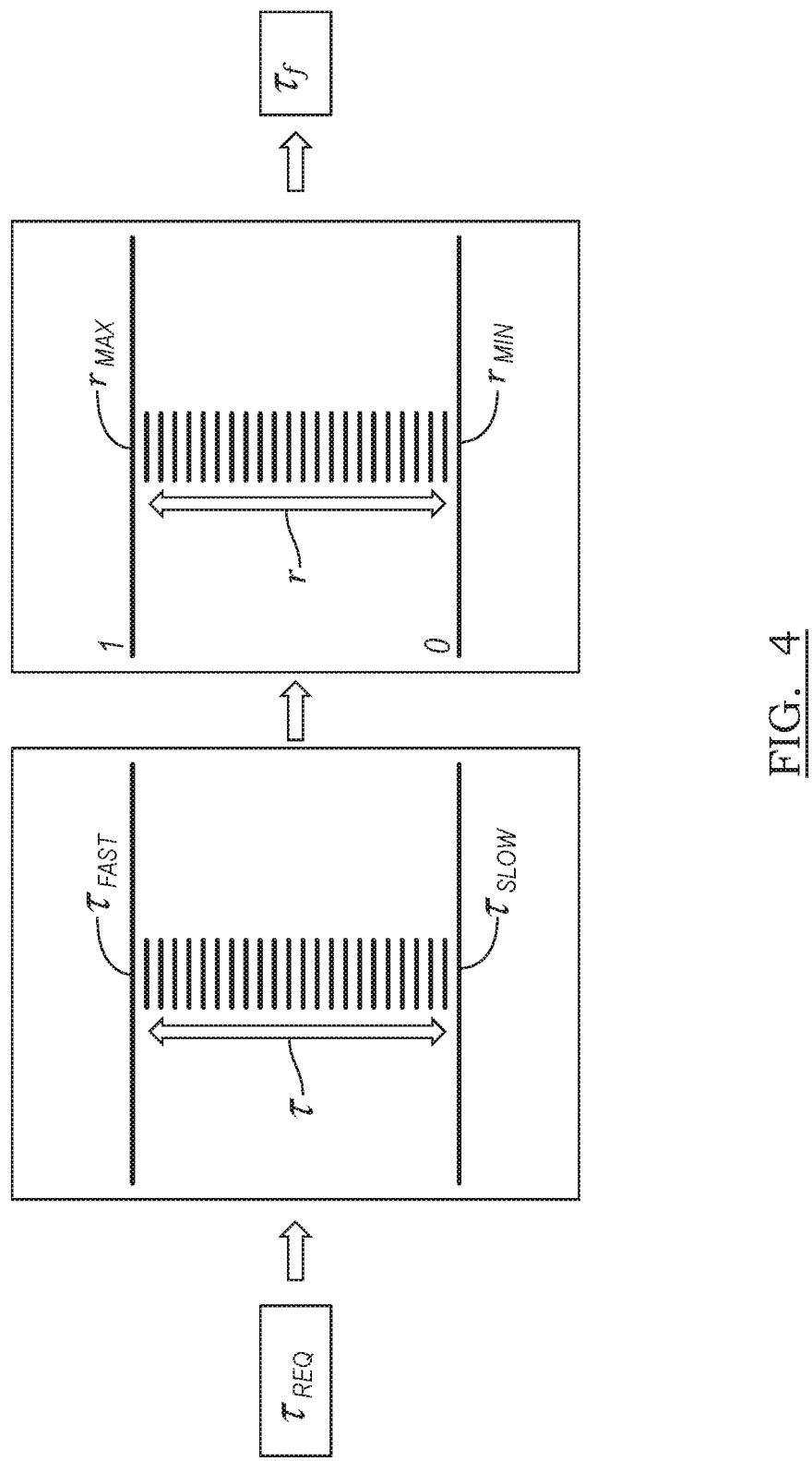
FIG. 4 is a schematic depicting a method of controlling an engine of a vehicle, in accordance with an aspect of the present invention.
Figure 5:
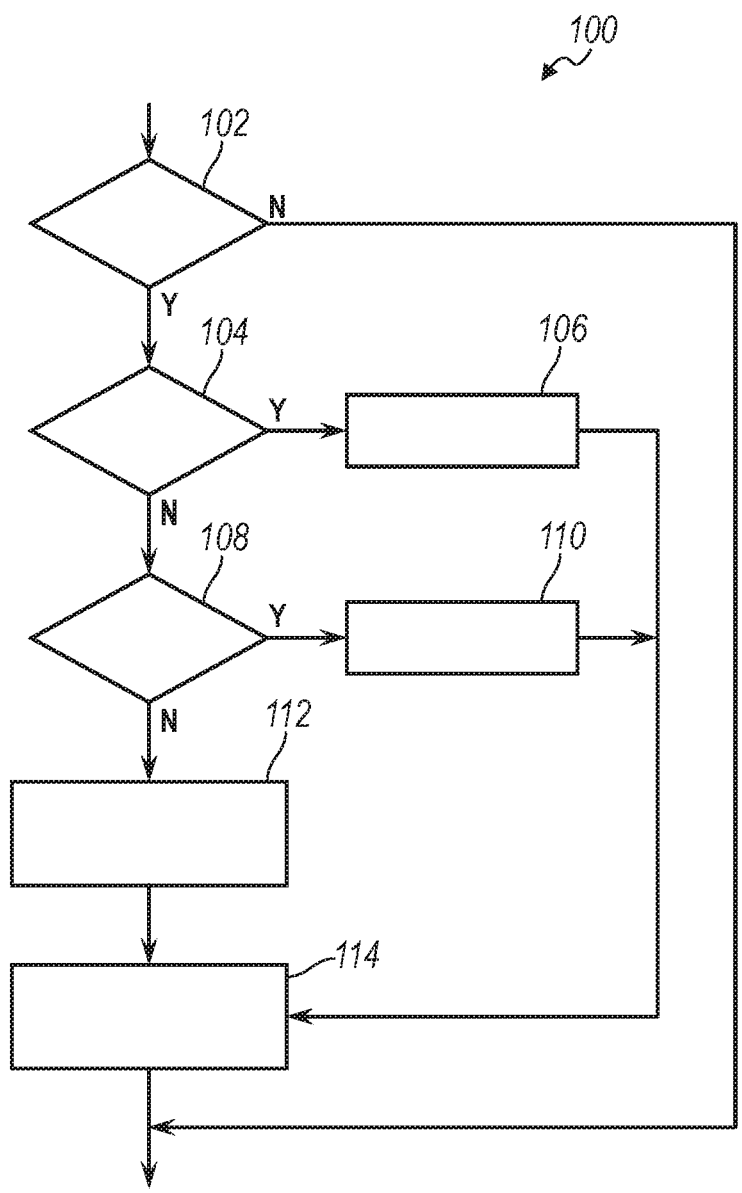
FIG. 5 is a flow chart depicting a method of controlling an engine of a vehicle, in accordance with an aspect of the present invention.

A schematic of the engine control operation is illustrated in FIG. 4 while a flowchart of the cylinder reactivation torque smoothing control method 100 is shown in FIG. 5. For example, a first condition that is required to begin the cylinder reactivation torque smoothing control method 100 is that the engine 12 is running in the cylinder deactivation mode. Next, the method begins with a first step 102 of receiving a torque request $t_{req}$ from the operator or driver. The torque request $t_{req}$ will typically come in the form of an increase in accelerator pedal pressure, however, the torque request $t_{req}$ can come in other forms without departing from the scope of the invention. One such torque request $t_{req}$ may result from an active or adaptive cruise control. The torque request $t_{req}$ is compared to a high or fast torque exit threshold $t_{fast}$. In a second step 104, if the torque request $t_{req}$ is greater than the fast exit threshold torque $t_{fast}$, then the variable torque reduction ratio r is set to 1.0 $r_{max}$ in a third step 106. If the torque request $t_{req}$ is not greater than the fast exit threshold torque $t_{fast}$, then the torque request $t_{req}$ is compared to the slow exit threshold torque $t_{slow}$ in a fourth step 108. If the torque request $t_{req}$ is less than the slow exit threshold torque $t_{slow}$, then a fifth step 110 sets the variable torque reduction ratio r to 0.0 $r_{min}$.

If the torque request $t_{req}$ is between the fast torque exit threshold $t_{fast}$ and the slow exit threshold torque $t_{slow}$, a sixth step 112 sets the variable torque reduction ratio r equal to the proportion that the torque request is between the fast and slow exit threshold $t_{fast}$, $t_{slow}$. Thus, the final torque engine output $t_f$ is set in the seventh step 114 as the slow exit threshold torque $t_{slow}$+ the variable torque reduction ratio r times the difference of the fast exit threshold torque $t_{fast}$ and the slow exit threshold torque $t_{slow}$.

$$t_f = t_{slow} + r(t_{fast} - t_{slow})$$

Once the final torque output $t_f$ is calculated for a particular torque request $t_{req}$, spark control is used to smoothly increase the torque output from the previously deactivated cylinders 38. For example, for any particular engine, the fast and slow exit threshold torques $t_{fast}$, $t_{slow}$ are particular numbers for a given set of operating parameters found on calibrated tables stored in the powertrain control module 20. In this manner, the cylinder reactivation torque smoothing control method 100 is capable of controlling engines of many displacements and configurations without departing from the scope of the invention.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for operating an internal combustion engine, the method comprising:
   providing a vehicle having an internal combustion gasoline engine including multiple cylinders and wherein the engine is operating in a deactivated cylinder mode;
   receiving a torque request if a cylinder reactivation torque smoothing mode is active;
   setting a variable torque ratio to $r_{max}$ if the torque request is greater than a fast exit threshold torque;
   setting the variable torque ratio to $r_{min}$ if the torque request is less than a slow exit threshold torque;
   setting the variable torque ratio to a value between $r_{min}$ and $r_{max}$ if the torque request is between the fast exit threshold torque and the slow exit threshold torque, and
   calculating a component of final engine output torque using the variable torque ratio.

2. The method of operating an internal combustion engine of claim 1 wherein calculating the component of final engine output torque $t_f$ further comprises calculating the component of final engine output torque according to the formula:

$$t_f = t_{slow} + r(t_{fast} - t_{slow}), \text{ and}$$

wherein $t_{fast}$ is the fast exit threshold torque, $t_{slow}$ is the slow exit threshold torque, and r is the variable torque ratio.

3. The method of operating an internal combustion engine of claim 1 wherein setting the variable torque ratio to a value between $r_{min}$ and $r_{max}$ if the torque request is between the fast exit threshold torque and the slow exit threshold torque further comprises setting the variable torque ratio to a value proportional to the torque request if the torque request is between the fast exit threshold torque and the slow exit threshold torque.

4. The method of operating an internal combustion engine of claim 1 wherein setting the variable torque ratio to $r_{max}$ if the torque request is greater than a fast exit threshold torque further comprises setting the variable torque ratio to 1.0 if the torque request is greater than the fast exit threshold torque.

5. The method of operating an internal combustion engine of claim 1 wherein setting the variable torque ratio to $r_{min}$ if the torque request is less than a slow exit threshold torque further comprises setting the variable torque ratio to 0.0 if the torque request is less than the slow exit threshold torque.

6. The method of operating an internal combustion engine of claim 1 wherein setting the variable torque ratio to $r_{max}$ if the torque request is greater than a fast exit threshold torque further comprises setting the variable torque ratio to $r_{max}$ if the torque request is greater than the fast exit threshold torque wherein the fast exit threshold torque is derived from calibration tables having a fast exit threshold torque value for one of a plurality of operational parameters.

7. The method of operating an internal combustion engine of claim 1 wherein setting the variable torque ratio to $r_{min}$ if the torque request is less than a slow exit threshold torque further comprises setting the variable torque ratio to $r_{min}$ if the torque request is less than the slow exit threshold torque wherein the slow exit threshold torque is derived from calibration tables having a slow exit threshold torque value for one of a plurality of operational parameters.

8. A method for operating an internal combustion engine, the method comprising:
   providing a vehicle having an internal combustion gasoline engine having a deactivated cylinder mode;
   receiving a torque request if a cylinder reactivation torque smoothing mode is active;
   setting a variable torque ratio to $r_{max}$ if the torque request is greater than a fast exit threshold torque;
   setting the variable torque ratio to $r_{min}$ if the torque request is less than a slow exit threshold torque;
   setting the variable torque ratio to a value between $r_{min}$ and $r_{max}$ if the torque request is between the fast exit threshold torque and the slow exit threshold torque; and
   calculating a component of final engine output torque $t_f$ according to the formula:

$$t_f = t_{slow} + r(t_{fast} - t_{slow}), \text{ and}$$

wherein $t_{fast}$ is the fast exit threshold torque, $t_{slow}$ is the slow exit threshold torque, and r is the variable torque ratio.

9. The method of operating an internal combustion engine of claim 8 wherein setting the variable torque ratio to a value between $r_{min}$ and $r_{max}$ if the torque request is between the fast exit threshold torque and slow exit threshold torque further comprises setting the variable torque ratio to a value proportional to the torque request if the torque request is between the fast exit threshold torque and the slow exit threshold torque.

10. The method of operating an internal combustion engine of claim 9 wherein setting the variable torque ratio to $r_{max}$ if the torque request is greater than a fast exit threshold torque further comprises setting the variable torque ratio to 1.0 if the torque request is greater than the fast exit threshold torque.

11. The method of operating an internal combustion engine of claim 10 wherein setting the variable torque ratio to $r_{min}$ if the torque request is less than a slow exit threshold torque further comprises setting the variable torque ratio to 0.0 if the torque request is less than the slow exit threshold torque.

12. The method of operating an internal combustion engine of claim 11 wherein setting the variable torque ratio to $r_{max}$ if the torque request is greater than a fast exit threshold torque further comprises setting the variable torque ratio to $r_{max}$ if the torque request is greater than the fast exit threshold torque wherein the fast exit threshold torque is derived from calibration tables having a fast exit threshold torque value for a plurality of operational parameters.

13. The method of operating an internal combustion engine of claim 12 wherein setting the variable torque ratio to $r_{min}$ if the torque request is less than a slow exit threshold torque further comprises setting the variable torque ratio to $r_{min}$ if the torque request is less than the slow exit threshold torque wherein the slow exit threshold torque is derived from calibration tables having a slow exit threshold torque value for a plurality of operational parameters.

14. A powertrain for a vehicle, the powertrain including:
an internal combustion engine having a plurality of cylinders and an output member, and wherein the plurality of cylinders produce torque and said engine having a deactivated cylinder mode;
a transmission having an input member, an output member, and a plurality of selective gear ratios, and wherein the input member is selectively connected to the output member of the engine;
a powertrain control module having a control logic sequence, and wherein the powertrain control module controls the operation of the engine and transmission and the control logic sequence includes:
 a first control logic for receiving a torque request if a cylinder reactivation torque smoothing mode is active;
 a second control logic for setting a variable torque ratio to $r_{max}$ if the torque request is greater than a fast exit threshold torque;
 a third control logic for setting the variable torque ratio to $r_{min}$ if the torque request is less than a slow exit threshold torque;
 a forth control logic for setting the variable torque ratio to a value between $r_{min}$ and $r_{max}$ if the torque request is between the fast exit threshold torque and slow exit threshold torque, and
 a fifth control logic for calculating a component of final engine output torque using the variable torque ratio.

15. The powertrain of claim 14 wherein the fifth control logic for calculating the component of final engine output torque further comprises calculating a component of final engine output torque $t_f$ according to the formula:

$$t_f = t_{slow} + r(t_{fast} - t_{slow}), \text{ and}$$

wherein $t_{fast}$ is the fast exit threshold torque, $t_{slow}$ is the slow exit threshold torque, and r is the variable torque ratio.

16. The powertrain of claim 15 wherein the forth control logic for setting the variable torque ratio to a value between $r_{min}$ and $r_{max}$ if the torque request is between the fast exit threshold torque and slow exit threshold torque further comprises setting the variable torque ratio to a value proportional to the torque request if the torque request is between the fast exit threshold torque and slow exit threshold torque.

17. The powertrain of claim 16 wherein the second control logic for setting the variable torque ratio to $r_{max}$ if the torque request is greater than a fast exit threshold torque further comprises setting a variable torque ratio to 1.0 if the torque request is greater than a fast exit threshold torque.

18. The powertrain of claim 17 wherein the third control logic for setting the variable torque ratio to $r_{min}$ if the torque request is less than a slow exit threshold torque further comprises setting the variable torque ratio to 0.0 if the torque request is less than a slow exit threshold torque.

19. The powertrain of claim 18 wherein the second control logic for setting the variable torque ratio to $r_{max}$ if the torque request is greater than a fast exit threshold torque further comprises deriving the fast exit threshold torque from calibration tables stored in the powertrain control module and having a fast exit threshold torque value for a plurality of operational parameters.

20. The powertrain of claim 19 wherein the third control logic for setting the variable torque ratio to $r_{min}$ if the torque request is less than a slow exit threshold torque further comprises deriving the slow exit threshold torque from calibration tables stored in the powertrain control module and having a slow exit threshold torque value for a plurality of operational parameters.

* * * * *